Dec. 30, 1952   W. B. HERNDON ET AL   2,623,409
TRANSMISSION VIBRATION DAMPENER
Filed May 14, 1945   3 Sheets-Sheet 2

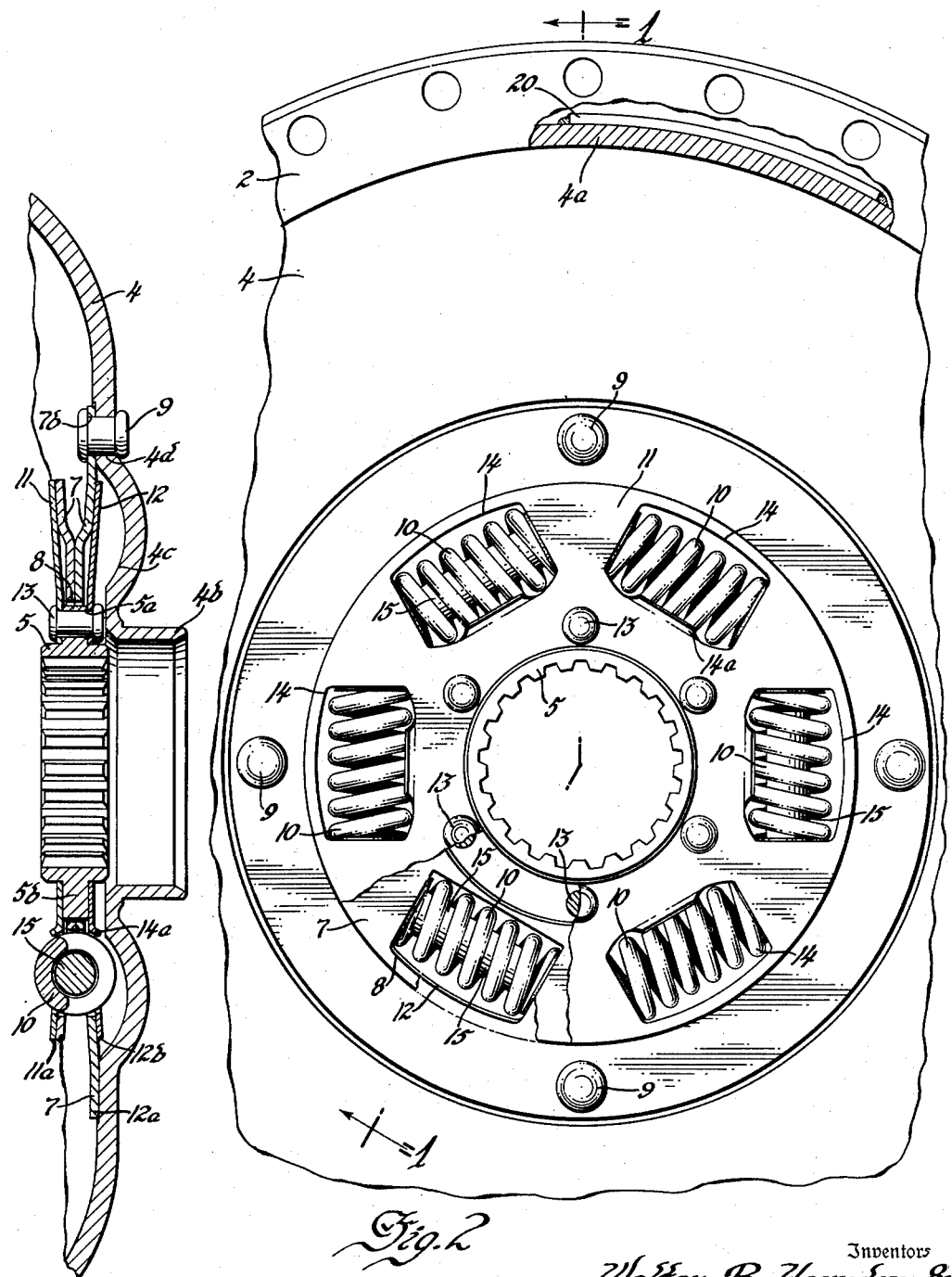

Inventors
Walter B. Herndon &
Alexander Hardy
By Blackmor, Spencer & Olive
Attorneys

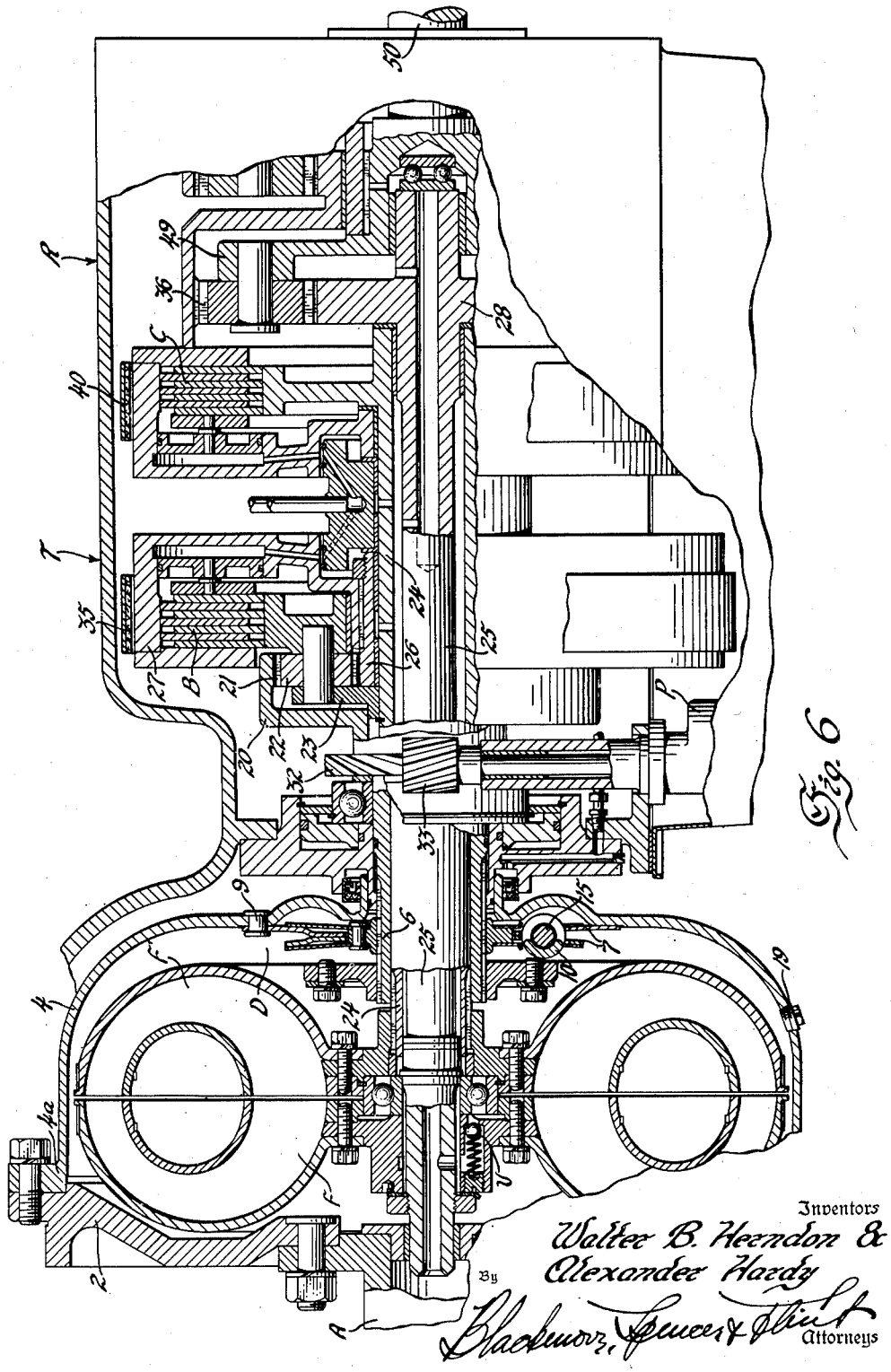

Patented Dec. 30, 1952

2,623,409

UNITED STATES PATENT OFFICE 2,623,409

TRANSMISSION VIBRATION DAMPENER

Walter B. Herndon and Alexander Hardy, Detroit, Mich., assignors to General Motors Corporation, Detroit, Mich., a corporation of Delaware Application May 14, 1945, Serial No. 593,728

22 Claims. (Cl. 74—688)

The present invention relates to mechanisms and devices for absorbing torsional vibrations and torque shocks in the transmitting of engine power from variable torque engines to variable speed ratio transmissions, in drive structures wherein power plants are directly connected to transmission units.

The device of the invention may be built inside a connecting member which is positively fixed to the shaft of the engine, and may drive a shaft directly providing input power to the transmission unit, and it may be installed in a drum which houses drive coupling elements of the said unit.

In utilizing the invention, one may devise a hub-and-flange arrangement, such as demonstrated herein, which has the flange member affixed to the driving drum of a transmission such as shown in Fig. 1 of Letters Patent U. S. 2,377,696 to O. K. Kelley issued June 5, 1945, with the hub member attached to the input power shaft of the transmission, with the object of absorbing above-or-below average energy pulsations originating in the engine or in the mechanism driven by the engine.

It is an object of the invention to provide in such a device spring means to cushion torque shock placed annularly in the device so as to deflect rotationally while retaining spring alignment against the effect of centrifugal force on the spring means and associated parts, and it is a further object to provide rotational abutment for the said spring means which under torque deflection tends to maintain said alignment, and additionally to provide against excess wear of the parts in mechanical contact, in the device.

An object is to provide in a driving structure such as shown in the demonstration herewith, a mounting of the device within a driving drum enclosing fluid torque transmitting members which is self sealed against loss of fluid from the space within the drum.

An additional object is to provide a vibration damper device which is constantly operative and constantly connected between an engine and drive transmitting transmission elements, whether or not the transmission is in gear, and thereby capable of absorbing torque impulses reflected from said transmission elements as well as those coming from said engine.

A further object is to provide in a vibration dampener an arrangement of energy storage means for above-and-below average torque impulses with friction energy absorption means located concentrically to the shafting, at a larger diametral distance than that of the said energy storage means.

Another object is to provide relative rotation stop means in such a vibration dampener, located within coil springs seated in annular recesses in the driving and driven members, said stop means being of shorter length than said recesses and said coil springs, and of a diameter to be gripped by the inner diameter of said springs when the latter are not loaded by the driving torque, as explained in detail below.

An additional object is to provide an arrangement of the foregoing elements which includes aperture abutments for the relative motion permitted by the coil springs, said abutments diverging radially outward when the device of the invention is not transmitting torque, but coming to approximately parallel relationship when the device is under positive torque load.

Further objects, provisions, advantages and results will be understood in detail further from the following specification and appended drawings in which:

Figure 1 is a vertical section taken thru the centerline, at 1—1, Fig. 2, of a form of the invention as made for the transmission drive of Figure 6.

Figure 2 is a view of Figure 1 taken from the left.

Figure 3:
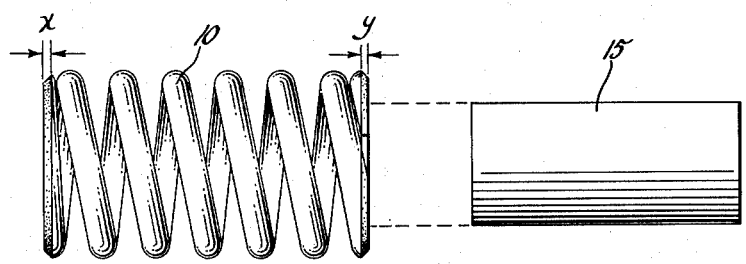
Figure 4:
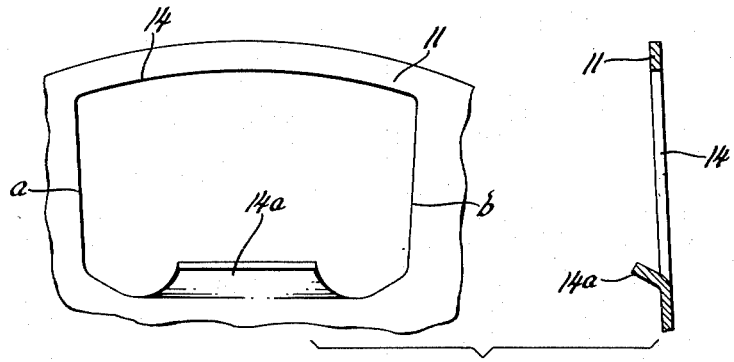
Figure 5:
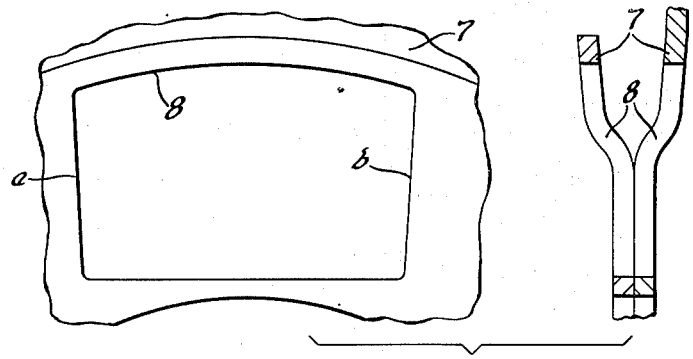

Figure 3 is an external view of one of the coil springs and abutment pins of Figure 1. Figure 4 shows a coil spring aperture of the side plates of Figures 1 and 2. Figure 5 shows a similar registering aperture in the driving member 7 of Figures 1 and 2.

Figure 6 is an elevation section view of an installation of the invention of the foregoing figures in a transmission such as referred to above in Fig. 1 of U. S. 2,377,696 to O. K. Kelley.

Figure 1 demonstrates a vertical, sectional view of the parts of the assembly attached to driving drum 4, and driven by it. The drum 4 is attached to the engine flywheel at flange 4a by bolts or rivets, and extends inwardly toward the shaft center line, terminating in collar 4b. The curvature of the drum is interrupted at a point close to the shaft center by a pressed out portion 4c external to which are drilled a concentric group of rivet holes 4d.

The hub member 5 is internally splined to accommodate splines of the transmission input shaft 6, and the hub is drilled concentrically for rivet holes 5a. The center abutment member 7 consists of two disc-like pieces welded together to form a resilient flared flange of V-section having an inner diameter slightly larger than the outer diameter of the flange 5b of hub 5, and at the external periphery on the larger diameter is drilled a ring of holes 7b to match the rivet holes 4d of the drum 4.

As shown better in Figure 2 there are six apertures in member 7 formed concentrically about the shaft center to provide end walls and recesses for the cushion springs 10. The apertures are numbered 8.

On either side of the member 7 are placed flexible friction washers 11 and 12 riveted to the flange of hub 5 by rivets 13. In the mounting of these friction washers the operation of riveting stresses them under axial tension with a radial beam load in a manner resembling a Bellville spring. The external peripheral portions 11a and 12b of the washers facing inwardly bear against the adjacent friction faces of the resilient member 7. At a radial center distance equivalent to the spacing of the six apertures in member 7 are formed six apertures numbered 14 in each of the side plates or washers 11 and 12, there being inner flared lips 14a in each turned outward to accommodate the springs 10. The latter are preloaded and inserted prior to riveting so that the parts may fit closely. These springs are compressed to a given or predetermined preload value in their axial dimension before insertion, and contain 3 short abutment pins 15 as shown in Fig. 2 in three of the six coil spring apertures, which limit the angular movement of hub 5 with respect to drum 4, and which hold the springs cylindrical against centrifugal force warping. The rivets 9 which attach the member 7 to the drum 4, seal against loss of liquid from inside the drum, while the friction bearing between plates 11 and 12 and the member 7 likewise provides a labyrinth against loss of oil.

The drain plug 19 permits inspection or filling of the drum 4 and is counterbalanced by small weight 20 spot-welded on the opposite diameter.

The operation of the dampening device as above described permits a wide angular movement between the hub 5 and drum 4 so that the device will be adaptable to an engine such as a six cylinder type which does not lend itself readily to full dynamic balancing. This result is obtained by placing the friction surfaces 11a and 12b on a large diameter, as shown, and by giving the springs 10 a considerable pre-load, so that an ability to absorb pulsations of torque of higher than normal pulsation is provided. This invention is also especially useful in transmissions for engines operated at high speed, for the stop pins 15 serve as abutments to limit the degree of rocking motion and also prevent the springs 10 from bowing outward under centrifugal force. This construction is believed novel, in space arrangement as well as operative function.

The invention embodies the feature of diverging end abutments a and b of the apertures 8 and 14 in the plates 11, 12 and members 7. This feature is described in Figures 4 and 5 which shows the apertures in outline. It has been argued that inwardly diverging end walls for these apertures might assist in counteracting centrifugal force but when a dampener so equipped is under torsional load the end walls may move to relative angular positions far from parallel. The present construction avoids this distorting effect of the springs 10 by having a diverging end abutment angle in a condition of rest which, under a predetermined torsional moment, brings the end abutments a and b approximately parallel.

Figure 6 herein is of a version of a modern type of step-ratio transmission unit, having the engine shaft A attached to flywheel 2 bolted to drum 4 housing the fluid flywheel elements F and F' of the unit.

The vibration dampener assembly of the foregoing Figures 1 to 5 is shown as assembly D, transmitting engine torque to the transmission unit T thru shaft 6, drum 20 and annulus gear 21 meshing with planets 22 of carrier 23 attached to hollow shaft 24 of fluid element F'. The central shaft 25 is keyed to element F and drives the sun gear 28 of the rear unit R coupled to load shaft 50, thru carrier 49.

The sun gear 26 of the front unit T is braked by band 35 on drum 27 to drive carrier 23 at a forward reduction speed. The drum of annulus gear member 36 is braked by band 40 to establish low gear reaction in the rear unit R.

Clutch B of unit T couples carrier 23 and sun gear 26 for the unit to transmit 1-to-1 speed ratio to shaft 24 and element F'. Clutch C couples annulus member 36 of unit R to shaft 24 for establishing a compound couple between the two units T and R through the coupling F, F'.

When there is neutral, or no-drive, the clutches B and C and bands 35 and 40 are released, and the shaft 6 drum 20 and annulus gear 21 spin with the engine, subject to friction bearing drag which may cause sun gear 26, carrier 23, shaft 24, element F' and connected parts to rotate idly, while if the shaft 50 has rotation, carrier 49 may likewise cause spinning of the connected parts. Engine torque is established by loading band 35 to stop rotation of sun gear 26, which applies torque multiplication to shaft 24 at above a given speed of element F', causing F to transmit torque to shaft 25 and sun gear 28 of unit R, provided band 40 has been applied to hold drum 36 from turning. A pattern of four speeds forward is established for the drive by units T and R as described in Letters Patent U. S. 2,357,295 to Earl A. Thompson issued September 5, 1944, and in U. S. 2,211,233 to O. K. Kelley, issued August 13, 1940. The transmission input shaft 6 has gear 32 driving gear 33 of pump P connected to fill the interior of the drum 4 and supply the working space between elements F and F' from which excess pressure is relieved by check valve V leading back to the suction side of the pump. The Thompson patent further describes the mechanical nature of the fluid flywheel as a torsional dampening device for the torques transmitted by it.

The combination shown in Figure 6 of the present disclosure therefore adds to the ability of the overall assembly to absorb torque shocks and impulses since the fluid flywheel assembly F,F', as described in the aforesaid Thompson patent absorbs energy from impulses endeavoring to pass between the transmission units, while the addition of the present invention absorbs impulses which would endeavor to pass from and to the engine shaft and attached parts. Echoing impulses reflected from the transmission torque reaction points are likewise readily absorbed in both series and multiple combination, as will be evident from study of Figure 6, with reference to the Thompson patent.

The new combination is therefore believed novel and useful over prior art disclosures in this field. It should be understood that with a transmission unit of this type in which division and recombination of fractional torques occurs in certain ratios, an unusual pattern of impulses may be generated because of that fact, because of the direct and constant connection to the engine of transmission drive elements, and the utilization of controllable torque-reaction supporting means in the transmission rather than changing of direct couples in multiple paths to the load shaft.

Although the gear groups have fixed ratio relationships but varying in instantaneous torques because of the introduction of the fluid flywheel slip factor under certain power conditions, it is possible for momentary resonance to exist between the components of a torque impulse and its reflection, which resonance, as is understood, could persist long enough to create a disagreeable shake to the vehicle as well as an unpleasant noise or whine. It is therefore of especial utility herein, to make advantage of means to damp out torque impulses both within the transmission and between the engine and the drive assembly, for which the present structures are provided. This facility further safeguards against the excessive wear which might be occasioned upon the driving parts, since the yielding and energy absorbing actions are deliberately provided in the damping devices provided, rather than in the other driving parts.

The Letters Patent U. S. 2,042,570 issued June 2, 1936, to E. E. Wemp, in Figure 6, and in the specification on page 2 beginning at line 62 describes a clutch dampener design aimed to counteract the effect of centrifugal force to bow the springs outward for preventing scoring, which is to diverge the aperture end walls inward by a measured inclination providing a circumferential difference of about .02", in the example, on the premise that this preloads the springs so that their outer turns are more stressed than the inner ones, so as to tend to bow them bodily inward.

In the present invention, the instruction of the present demonstration as shown in the described drawings is opposite to the above teaching.

Applicants' Figures 4 and 5 show single apertures in which the inner circumferential distance may be as much as 0.084" less than the outer aperture distance, in the side plates 11, 12 and the member 7. This construction has the advantage that when the dampening device is under torque loads with the springs 10 under compression, the aperture end walls $a$ and $b$ of alternate elements approach each other and become parallel, and under extreme deflection, in certain designs, may actually pass beyond parallelism and diverge inwardly.

This action may be visualized by observing the various angles assumed by the jaws of a pair of pliers as they are opened and closed.

It is within the purview of the invention herewith to have an initial outward radial divergence of the end walls under no load, with inward divergence under load deflections greater than produced by a given torque; or to arrange these elements so that over the normal driving torque range, the aperture ends are substantially parallel.

In a state of rest, the pre-stressed springs 10 fit closely around the pins 15 with a sliding bearing relationship, so that there is no rattling during the engine idling period. When the torque is developed as the transmission is actuated to transmit drive, the springs are compressed and while the grip of the coils may now be slightly loosened, under acceleration, the pins are released and become now restrained between the abutments at the driving ends of the apertures in the member 7. This action may take place gradually, or under sudden acceleration, the springs being compressed, the pins moving into immediate abutment with the aperture driving ends.

With a negative torque impulse, the springs may be relieved momentarily and the internal coil diameter tend to diminish, which action may apply a slight gripping force to retain the pins in their original lag positions against a tendency to shift to the opposite ends of the apertures. Under steady negative torque, as when coasting with the throttle closed, the degree of negative torque may not be sufficient under ordinary vehicle operation to expand the coil springs, so that a tendency for the pins to remain in their original lag positions or drift slowly, if at all, away from the driving ends of the apertures may result.

It is found that in practice, with springs and pins of uniform dimension, when the pins and springs are inserted in the apertures, with the springs preloaded to seat therein, there is no appreciable rattle of the pins, even under rather heavy torque reversal tests. This is true because of the normal gripping and bearing action between them which is only relieved when the device is subject to torque loads greater than a given design value. Only under extremely violent torque impulses beyond general experience, is it possible to obtain a sudden shuttling action of the pins in the apertures.

In the present invention, it should be remembered that the mass of spring and stop pin is wholly supported within the recess formed by the apertures 14 and 8 in plates 11, 12 and member 7, and therefore the material of the member 7 is preferably of hardened steel to avoid excess wear of the end portions of the apertures where the springs and pins seat, since these parts, in normal use are under continuous small movements following the complex pattern of torque impulses arising from engine power variation, changes in transmission ratios and inertias, and acceleration and deceleration of the vehicle.

The end turns of the springs at $x$ and $y$ may be electroplated or coated with a soft metal to provide a bearing action at the points of mechanical contact, if required, and as indicated in Fig. 3. The portions desired to be uncoated may be masked, as is usual practice. This figure shows a 45 degree end chamfer of the spring ends, within the soft metal coated zones.

It is not deemed essential to dwell at length herein on the description of operation, since it is obvious from the above account how the device operates during the initiating of drive, and during the drive-transmitting period. It may be stated further that when the transmission of Fig. 6 is non-driving or in neutral when the engine is running, no driving torque is being transmitted, there is no torsional deflection of the springs 10, and the connected rotating masses of the variable speed transmission elements offer sufficient resistance to change of rate of acceleration and deceleration, that if pronounced low frequency impulses are given to drum 4 and driving member 7 of Figure 1, minor and barely perceptible relative movements of the members 5 and 7 will occur, the friction surfaces 11 and 7 absorbing the energy such that the vehicle driver and passengers are not aware of such reciprocating action.

The statement above as to the invention being especially adaptable to types of engines which by design produce heavier torque pulsations than others, specifically refers to the use of the heavy, pre-loaded coil springs 10, and the positioning of the pre-loaded friction absorption surfaces radially exterior thereto. It will be understood between elements 11—7—12 that the leverage effect of these surfaces shown is much greater than it would be if they were placed inside the annular zone of the coil springs. This device is adapted to operate over a wider range of angular movement than similar devices used in driven clutch plates, since it embodies energy absorption means which must operate without the benefit of the ability to slip provided by the ordinary friction clutch coupled to engine, and deal with reactive and negative impulses reflected from the variable speed ratio transmission.

It is believed above adequately demonstrated that the objects, advantages and results set forth in the preamble of this specification are effectual and represent novel combinations of elements providing useful results thus described.

The foregoing description of structure and operation of the invention is believed wholly clear to one skilled in the art such that the teachings herein may be applied with other modes employed than specifically shown herein, but without departing from the scope of the applications of principles herein demonstrated. The appended claims are drawn to cover the legitimate and proper adaptations, modifications and alternatives.

We claim:

1. In power transmission, an engine, a variable speed step ratio transmission connected to drive a load shaft, said transmission having a power input element adapted to be constantly driven by said engine, a torque-shock absorption device coupling said engine and transmission power input element including a power input member and a power output member, preloaded coil spring means adapted to transmit continuous torque between the members, coacting friction means having elements attached to move rotationally with the said members and located radially external to the said spring means, and guiding abutment pins having normal external bearing with the inner turns of said coil springs and operative to limit the relative angular movement between said members during variable torque intervals of drive by said engine of said transmission.

2. A torsional vibration dampener transmitting torque between an engine and a transmission input shaft consisting of a driving member located radially external and concentric with a driven member, said driving member having a plurality of apertures in annular arrangement radially inward of friction surfaces formed laterally thereon, said driven member having attached side plates with equal sized apertures registering with the first-named apertures to form a plurality of spring recesses and having friction surfaces on said plates mating with said first-named surfaces, preloaded coil springs located in said recesses for transmitting a given torque between said members, reinforcing pins within the said springs of larger diameter than the unloaded inner diameter of said springs and of a length to stop the relative rotational motion of said members at a given angular movement thereof from the position of zero torque deflection of said springs, and tensioning means for said plates effective to maintain them in oil-sealing friction surface contact with said driving member at all times.

3. In power transmission mechanism, a variable torque engine, a variable speed step ratio transmission unit for driving a load shaft, actuation mechanism for said unit operative to change the said step ratios thereof while maintaining a predetermined drive torque between said engine and load shaft, a torque-impulse dampening device adapted to couple a power input member driven by said engine and a power delivery member fixed to drive the input of said unit, said device consisting of a hub for driving said unit input, a flange member of inward tapered conical form located radially external to said hub and attached to said power input member, flexible side plates attached to said hub and bearing axially against the conical surfaces of said flanged member to provide friction resistance to relative rotational motion between the flanged member and said hub, registering circumferential apertures in said side plates and said flanged member forming recesses for a plurality of coil springs effective to transmit torque between said flanged member and said plates at varying relative angular positions thereof, and guide pins fitted within said coil springs having a unit length less than the normal spring length for permitting a predetermined angular movement between the said member and said plates commensurate with a given torque deflection of said springs, the said described device providing a wide range of power impulse absorption during transitions of drive by said mechanism from one step ratio to another of said unit.

4. In a construction such as set forth in claim 3 the sub-combination of the said guide pins having a diametral dimension greater than the inner diametral dimension of the said coil springs in unloaded condition.

5. In power transmitting devices, a variable torque engine, a torque-sustaining driving element connected to said engine, a driven element connected to transmit torque normally to a load shaft, a web on said driving element extending radially inward, side plates adjacent said web attached to said driven element and stressed to apply a continuous frictional force against said web, a plurality of driving coil springs preloaded for transmitting variable torque between said elements, a plurality of elongated registering apertures formed concentrically in said plates and said driving element extending in a circumferential direction symmetrically spaced, said apertures constituting recesses for said preloaded springs, the radial ends of the apertures acting as abutments for the ends of the preloaded springs and the circumferential limits of the apertures permitting free movement of the coils of said springs, and a plurality of cylindrical pins mounted inside the coils of said springs, one to each of a number of said springs, the linear dimension of said pins being less than the end-to-end dimension of the apertures and the diameters of the said pins being approximately that of the inner spaces of said preloaded springs so as to afford bearing action therebetween, said pins providing support against centrifugal bending of the springs at high engine speeds and providing right-angular abutment with respect to the coil spring axes for predetermined relative angular motion of said driving element and said plates.

6. In power transmitting devices, an engine shaft, a flywheel fixed thereto, a drive-transmitting drum attached to the flywheel, a variable step ratio transmission unit coupled to a load shaft and having an input shaft, the said unit being arranged to transmit continuous torque during drive and changes of drive of said unit, a rotationally yielding mechanism coupling said drum and input shaft, said mechanism comprising an input flange connected to said engine shaft, an output hub and side plates connected to said unit input shaft, spaced registering apertures in said flange and said plates, preloaded coil springs inserted in said apertures, abutment pins located within said springs and having bearing relationship therewith, and tensioned studs securing said plates to said hub and operative to provide resilient friction loading of said plates against the adjacent faces of said flange, such that the said mechanism is effective to absorb torque impulses continuously when said engine is driving said unit, and to absorb acceleration and deceleration impulses developed by said engine shaft and reflected from said load shaft.

7. In the combination set forth in claim 6, the sub-combination of friction means consisting of said side plates rotating with said input shaft and subject to relative rotational motion between said drum and input shaft and having their friction surfaces located radially external to the said preloaded spring, in order to provide a relatively large frictional area.

8. In the combination set forth in claim 6, the sub-combination of friction means consisting of said drive transmitting plates being subject to relative rotation between said drum and input shaft and having their zones of friction bearing located radially external to the said preloaded springs, and of constantly acting preload means consisting of tensioning stud elements for said friction means.

9. In the combination set forth in claim 6, the sub-combination of friction means adapted to absorb predetermined relative slip forces during yielding of said mechanism and subject to relative rotation between said drum and input shaft, said means consisting of a driving member of conic form attached to said drum coacting with said friction plates axially placed and bearing angularly against said member and of preload means for said plates located radially inward of the area of conic friction bearing thereof.

10. In the combination set forth in claim 6, the sub-combination of said drum containing a body of fluid, of friction means subject to relative rotation of said drum and input shaft consisting of a driving member affixed to said drum providing a friction surface and of adjacent plates rotating with said shaft and having friction surfaces mating with said surface, the friction surfaces forming a partial baffling oil seal to prevent escape of fluid from said drum.

11. In the combination set forth in claim 6, the sub-combination of friction means effective to absorb differential energy impulses causing relative rotational motion between said drum and input shaft including a labyrinth formed by elements of said friction means operative to prevent free flow of fluid out of said drum.

12. In the combination described in claim 6, the sub-combination of friction means effective to absorb differential energy impulses causing relative rotational motion between said drum and input shaft, including a drive-transmitting member, and mounting means fixing said member to said drum consisting of clamping elements passing through holes in said member and drum preloaded to seal said holes against leakage of fluid from said drum.

13. A variable speed ratio transmission, a driving drum adapted to contain a fluid, a driven shaft, a torque-impulse dampening mechanism coupling said drum and shaft permitting relative rotation thereof, and oil-flow baffling means associated with said mechanism effective to retard fluid leakage from said drum into the space occupied by said shaft.

14. A variable speed ratio transmission having drive elements operating by fluid circulation, a driving drum surrounding the said elements and serving as a housing therefor, and a torque-impulse dampener mechanism located adjacent the point of transfer of torque between said drum and said transmission and transmitting said torque, said mechanism providing a partial seal against leakage of circulating fluid from the space within the said drum.

15. In power transmissions, an engine shaft, an engine flywheel driven by said shaft, a driving drum attached to said flywheel and sealed thereto to prevent fluid loss from within the said drum, a variable speed transmission unit coupled to a load and having power-transmitting elements located to revolve within said drum, a fluid supply system for actuating said unit and connected to flow within said drum, and a torsional vibration dampener device connecting said drum with said unit and operative to provide a partial seal against leakage of the fluid of said system at the point of connection.

16. In power transmission, an engine, a driving member formed as a fluid-containing drum driven by said engine, a driven transmission member, a torque-impulse absorbing mechanism coupling said members, said mechanism being located inside of said drum and including preloaded drive-transmitting means consisting of springs and friction energy-dissipating means consisting of cone-shaped washers in parallel between said member, the said parallel relationship being provided by a plate connected for drive by said driving member and driving said driven member through said springs, said plate being arranged for frictional coaction with flanking elements of said friction means, and said friction washers constituting coacting resilient friction elements preloaded for constant friction bearing during both idling and torque transmitting intervals of said members, means attaching said mechanism to said members providing partial sealing against leakage of fluid from said drum, and preloading means applying sufficient force upon said elements to prevent leakage from said drum between said coacting friction elements.

17. In power transmissions, a variable torque engine constantly connected to a driving member, a transmission gear unit deriving its input power from said member and providing changes of step ratio during which torque is maintained upon a load shaft driven by said unit, a fluid torque-transmitting device embodied in said unit and operable to sustain all of the torque delivered by said unit including the torque existing during said ratio changes and adapted to prevent transfer of torque vibration impulses between drive transmitting elements of said gear unit, a transmission input shaft for said unit, and a torque impulse dampener mechanism constantly and resiliently coupling said member and said input shaft whereby said device and said mechanism are effective to absorb all torque vibration impulses originating in said engine, said load shaft or in the gear elements of said unit, the said mechanism including a power input and a power output member, preloaded coil springs adapted to transmit continuous torque between the members, coacting friction means having elements attached to move rotationally with the said members and located radially external to the said springs, and including guiding abutment pins having normal external bearing with the inner turn portions of said springs and operative to limit the relative angular movement between said members during variable torque intervals of drive between said driving member and said load shaft.

18. In power transmissions, an engine, a driving member driven by said engine, a driven transmission member, a torque impulse absorbing mechanism coupling said members including preloaded resilient drive-transmitting means consisting of springs and friction, energy-dissipating means consisting of cone-shaped friction washers located in parallel between said members, the said parallel relationship being provided by a plate connected for drive by said driving member and driving said driven member thru said resilient means, said plate being arranged for frictional coaction with flanking elements of said friction means, and said washers constituting coacting, resilient friction elements preloaded for constant friction bearing during both idling and torque transmitting intervals of said members, and said driving plate being attached to said engine driven member, said friction means being formed with said plate in a V-section with one of the legs of the V attached to the driving member, the said flanking friction elements being placed on either side of said driving plate and adapted to be secured to the said driven member, and preloading means consisting of tensioned stud elements securing said elements to said driven member for maintaining their peripheral zones in constant conical contact with a co-radial zone of said V-section of said plate, to provide a predetermined friction generating force between said elements and the adjacent legs of said plate.

19. In power transmission, an engine, a driving member driven by said engine, a driven member, a torque impulse absorbing mechanism coupling said members including preloaded resilient drive-transmitting means consisting of springs and friction, energy-dissipating means consisting of springs and friction, energy-dissipating means consisting of cone-shaped washers located in parallel between said members, the said parallel relationship being provided by a plate connected for drive by said driving member and driving said driven member thru said resilient means, said plate being arranged for frictional coaction with flanking elements of said friction means, and said washers constituting coacting resilient friction elements preloaded for constant friction bearing during both idling and torque transmitting intervals of said members, said driving plate being made from two discs attached to provide a radial V-shaped section having axial resilience, said plate being attached by one of the discs of the V-section to said driving member, said coacting friction elements having conical abutment with adjacent faces of said plate, and preloading means consisting of stud elements under tensional force operative to apply a uniform radial beam load on said elements and effective to deflect them conically against the adjacent faces of said plate continuously and with a predetermined frictional force.

20. In vibration dampening mechanisms for engine driven power drives, the combination of input and output members consisting respectively of a central web and flanking side plates thereto in friction contact, registering apertures concentrically disposed in said side plates and said central web, preloaded coil springs located in said apertures adapted to transmit torque between the said input and output members, abutment pins fitted axially into said apertures and having normal external friction gripping contact with the inner coil turns of said springs, and an arrangement of the aforesaid structures operative so that under an initial engine torque of predetermined value the resulting axial compression of the coil springs during engine idling torque conditions relieves the friction force between the said pins and springs following which the ends of the pins move to abutment with said end walls under increase of said torque.

21. In vehicle drive mechanisms, in combination, a variable torque engine, an engine shaft, a driven shaft, a step-ratio change-speed gear transmission having power input and power output members, the said power output members being constantly connected to said driven shaft during all driving and ratio-change intervals of said transmission in forward drive, a vibration absorption device consisting of power input and output elements, resilient springs adapted to maintain constant drive connection between said elements and including frictional elements adapted to absorb differential torque impulse forces developed between said elements as a result of deflections of said coil springs, apertures in said elements containing said springs, guide pins located within said springs operative to transmit torque directly between said elements under full torque deflection of said springs, and an arrangement of said engine shaft and said transmission in which the input element of said device is constantly connected to said engine shaft and the output element of said device is constantly connected to said transmission input member during all drive and ratio change intervals of said transmission in forward drive.

22. In power transmission devices, the combination of an engine shaft, a load shaft, a variable speed transmission adapted to connect said shafts including an input shaft, trains of step-ratio gearing and including fluid drive coupling elements consisting of facing turbine blade rotors arranged to be connected for transmitting torque between said shafts through said trains, a first vibration damper mechanism constantly connecting the said transmission input and engine shafts for delivering the torque of said engine to said transmission, said device being effective to absorb a predetermined range of torque impulses occurring between said shafts including torque impulses originating on said engine shaft and reflected from the said load shaft through said trains, and a second mechanism adapted to connect said transmission fluid coupling elements and effective to absorb torque impulses within a second range of values existing between said elements during drive operation of said transmission.

WALTER B. HERNDON.
ALEXANDER HARDY.

REFERENCES CITED

The following references are of record in the file of this patent:

UNITED STATES PATENTS

| Number | Name | Date |
|---|---|---|
| 1,088,241 | Royce | Feb. 24, 1914 |
| 1,727,153 | Ahlene | Sept. 3, 1929 |
| 1,830,746 | Ahlene et al. | Nov. 10, 1931 |
| 1,952,892 | Reed | Mar. 27, 1934 |
| 2,042,570 | Wemp | June 2, 1936 |
| 2,139,965 | Ljungstrom | Dec. 13, 1938 |
| 2,176,696 | Wemp | Oct. 17, 1939 |
| 2,215,671 | Swennes | Sept. 24, 1940 |
| 2,244,134 | Thelander | June 3, 1941 |
| 2,274,174 | Wemp | Feb. 24, 1942 |
| 2,319,496 | Fishburn | May 18, 1943 |
| 2,364,988 | McFarland | Dec. 12, 1944 |
| 2,371,574 | Swennes | Mar. 13, 1945 |
| 2,377,696 | Kelley | June 5, 1945 |
| 2,406,225 | Kelbel | Aug. 20, 1946 |
| 2,466,244 | Kelbel | Apr. 5, 1949 |